United States Patent
Mumford et al.

(10) Patent No.: US 8,175,235 B2
(45) Date of Patent: May 8, 2012

(54) LEASE MODEL FOR AVOIDING PERMANENT CARD LOCKING

(75) Inventors: Gregory L. Mumford, Marion, IA (US); Jon E. Abel, Cedar Rapids, IA (US); David A. Fitzgerald, Springville, IA (US); Radhika Gunasekar, Cedar Rapids, IA (US); Anna Marie Appleby, Cedar Rapids, IA (US); John M. Leslein, Marion, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1258 days.

(21) Appl. No.: 11/862,807

(22) Filed: Sep. 27, 2007

(65) Prior Publication Data
US 2009/0086942 A1   Apr. 2, 2009

(51) Int. Cl.
*H04M 15/00*   (2006.01)
(52) U.S. Cl. .......................... 379/114.2; 379/114.17
(58) Field of Classification Search ........... 379/114.15, 379/114.17, 114.2, 201.03, 201.12; 455/405, 455/406
See application file for complete search history.

(56) References Cited

U.S. PATENT DOCUMENTS

| | | | | |
|---|---|---|---|---|
| 5,469,497 A | * | 11/1995 | Pierce et al. | 379/114.17 |
| 5,677,945 A | | 10/1997 | Mullins et al. | |
| 6,198,915 B1 | | 3/2001 | McGregor et al. | |
| 7,437,144 B1 | * | 10/2008 | Andresen et al. | 455/405 |
| 2002/0061092 A1 | | 5/2002 | Maropis et al. | |
| 2002/0103762 A1 | | 8/2002 | Lopez et al. | |

FOREIGN PATENT DOCUMENTS

WO   01/45380   6/2001

OTHER PUBLICATIONS

International Search Report dated Dec. 4, 2008 (1 pages).

* cited by examiner

*Primary Examiner* — Quoc D Tran

(57) ABSTRACT

Methods relating to prepaid services include determining an unlocked status of an account configured to track usage of prepaid services. The methods further include locking the account for a length of time after the determining step. The methods further include providing, for a service period, a service to a user associated with the account subsequent to the locking step, and continuously extending the locking for an additional length of time throughout the service period.

20 Claims, 3 Drawing Sheets

LEASE MODEL FOR AVOIDING PERMANENT CARD LOCKING

BACKGROUND

Service providers may have the option to extend credit to customers for provided services with the expectation of payment at the termination of a service period. Alternatively, a service provider may require a customer to pay for services before they are provided. So-called prepaid services may allow a customer to purchase services prior to their provision and usage. Accordingly, a prepaid customer may maintain a positive monetary balance in a prepaid account held with the service provider. Alternatively, the customer may purchase units of service from the service provider for use over a period of time. In the example of a prepaid telecommunications service, a prepaid customer may purchase telecommunications services in units such as minutes.

A prepaid telecommunications service provider may establish a prepaid account for tracking the usage of any purchased minutes. Prepaid service providers may limit the access to such a prepaid account to a single customer at a time. For example, once a first customer begins to receive prepaid services tracked by the prepaid account, a second customer will be prevented from accessing the same prepaid account until such time that the first customer is no longer receiving prepaid services. Accordingly, prepaid accounts may maintain a locked status while being used by a customer. Concluding the provision of prepaid services may cause the locked status of an account to be removed.

Telephone networks and the infrastructure for maintaining prepaid accounts and providing prepaid services may not function as expected at all times. Prepaid accounts that are actively being used to receive prepaid services may maintain their locked status even if the customer is no longer receiving prepaid services. Moreover, a system issue may prevent the removal of the locked status of recently used prepaid accounts. Therefore, an account that potentially has an available prepaid balance may become inaccessible to a customer due to a continued locked status. Additionally, if the system does not recognize that the provision of services was halted due to a service interruption, the account balance may continue to be depleted. These situations may require the intervention of the service provider's customer service personnel for resolution.

DETAILED DESCRIPTION

Figure 1:
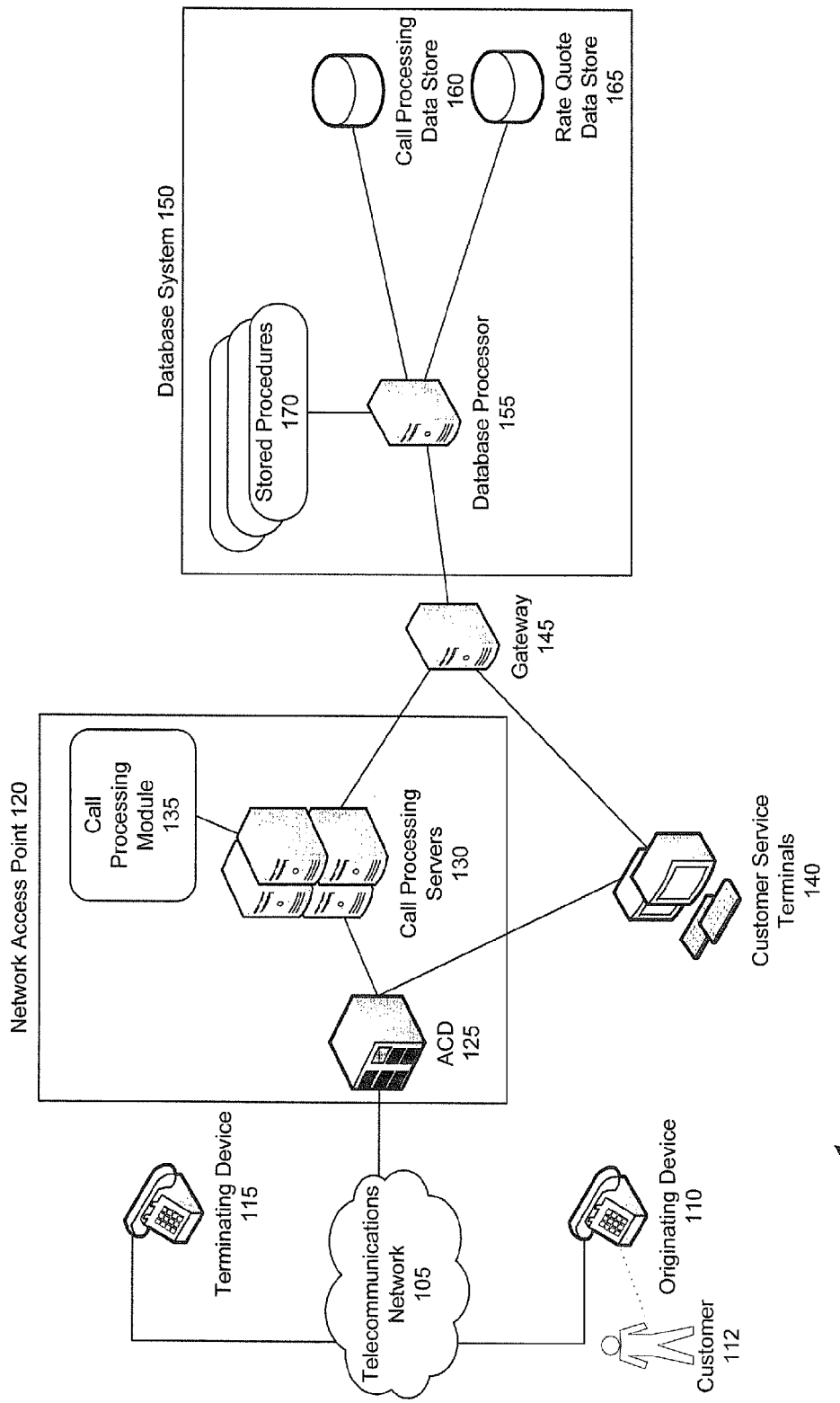
FIG. 1 illustrates an exemplary prepaid service system for providing prepaid telecommunication services.

FIG. 1 illustrates one possible exemplary prepaid service system 100 for providing prepaid telecommunication services. An originating device 110 connects to a network access point 120 and a terminating device 115 through a telecommunications network 105. The network access point 120 may maintain a connection to telecommunications network 105 and may include system 100 elements such as an automated call distributor (ACD) 125 as well as a plurality of call processing servers 130. In addition to connecting to the call processing servers 130, the automated call distributor may connect to one or more customer service terminals 140. A call processing module 135 may be located on the call processing servers 130 and may include computer instructions configured to provide prepaid telecommunication services to a customer 112. A gateway server 145 may serve as an intermediary between the call processing servers 130, the customer service terminals 140, and a prepaid database system 150. The prepaid database system 150 may include a database processor 155 configured to execute a plurality of stored procedures 170. The processor 155 additionally has access to a call processing data store 160 and a rate quote data store 165.

Telecommunications network 105 may be a circuit switched network generally referred to as a public switch telephone network (PSTN). Alternatively, telecommunications network 105 may be a combination of circuit switching and packet switching network elements cooperatively connected to enable signaling system seven (SS7) based telephone calls. Other networks such as cellular networks for wireless calls and Voice Over Internet Protocol (VOIP) networks for packet switched network based voice calls may also be integrated with telecommunications network 105. Accordingly, it is to be understood that network 105 includes switches, links, gateways, etc. as necessary to facilitate the transmission of calls and data between devices 110 and 115.

While depicted as a conventional telephone, originating device 110 may be any type of telecommunications device capable of connecting to telecommunication network 105 and communicating via one or more protocols associated therewith. Accordingly, originating device 110 may be capable of accepting input from customer 112 such as an access number for the telecommunications network access point 120, a prepaid account identifier 210 (FIG. 2), and a telephone number associated with the terminating device 115. Similarly to originating device 110, terminating device 115 may be any type of telecommunications device capable of connecting directly or indirectly with telecommunications network 105 and receiving an incoming call therefrom. While FIG. 1 merely depicts a single originating device 110 and a single terminating device 115, it is to be understood that there may be many such devices connecting to the prepaid services system 100 at any given time.

It is to be understood that FIG. 1 and this description thereof illustrates prepaid service in the example of prepaid telecommunications services. However, the method 300 described below, may in whole or part be applicable to other forms of prepaid services. Even in the example of prepaid telecommunications services, there may be multiple entities responsible for providing the elements of system 100. For instance, a telecommunications network provider may provide some of the components while a prepaid service provider may provide others. Additionally, terminating device 115 may not exist at all. For instance, originating device 110 may receive a prepaid service that does not include terminating device 115.

Network access point 120 provides a connection to telecommunications network 105 for the prepaid service provider. Network access point 120 may host telecommunications equipment for implementing a so-called intelligent network or intelligent services network. The intelligent network generally enables a telecommunications provider to offer value-added services, such as prepaid calling, to traditional telecommunication systems. Among other equipment, intelligent networks may include automated call distributor 125 and call processing servers 130. Network access point 120 may further provide local or wide area network connections for connecting prepaid services system 100 devices, e.g., automated call distributor 125, call processing servers 130, etc. While FIG. 1 only depicts a single telecommunications network access point, it is to be understood that prepaid services system 100 may have multiple such network access points 120, which may be geographically dispersed.

Automated call distributor 125 maintains a connection to telecommunications network 105 in order to receive incoming connections from originating device 110 and establish connections with terminating device 115. Automated call distributor 125 may include a telecommunications switching device such as a private branch exchange (PBX). Additionally, automated call distributor may include a processing device configured to execute call routing rules that direct an incoming call to other devices, e.g., call processing servers 130, customer service terminals 140, etc. Automated call distributor 125 may further queue incoming calls should there ever be insufficient resources available to immediately handle the calls. While FIG. 1 merely illustrates a single automated call distributor 125, other exemplary approaches may include multiple automatic call distributors 125.

Call processing servers 130 receive calls routed from automated call distributor 125 and may provide interactive functionality to customer 112. Call processing servers 130 may be automated response units, or voice response units. Such units may provide customer 112 with an audible menu of options. Customer 112 may select an option by entering a number on the key pad of their device 110 corresponding to a particular menu option. Call processing servers 130 may be further configured to receive customer 112 options through voice recognition software such that customer 112 may speak the menu option corresponding with their selection. Call processing servers 130 may receive from customer 112 multiple inputs in addition to any menu selections. These inputs may include a prepaid services account identifier 210 (FIG. 2), a security pin, and a phone number of a terminating device 115.

Call processing servers 130 may control automated call distributor 125 through signaling communication in order to establish a connection through telecommunications network 105 to terminating device 115. Similarly, call processing servers 130 may provide signaling instructions to automated call distributor 125 in order to end, or tear down, the connection between originating device 110 and terminating device 115. Call processing servers 130 may periodically monitor the connection between originating device 110 and terminating device 115 in order to track the duration of time in which the connection is maintained, and may further conference into the connection in order to provide automated messages to the customer 112, e.g., messages indicating an impending depletion of a prepaid services balance.

Additionally, call processing servers 130 may include a computer readable medium encoded with computer executable instructions configured to effectuate account tracking and call processing features of the prepaid services system 100. Such computer instructions may be included in a call processing module 135. Call processing module 135 may conceptually divide a call spanning a service period into one or more lengths of time such that each length of time may represent a service increment. Service increments may be a standard increment, a preliminary increment, or a custom increment. The length of time associated with a standard increment is generally equal to all other standard increments associated with a call. Similarly, the length of time associated with a preliminary increment is generally equal to other preliminary increments, if any, associated with the call. However, the length of time associated with a custom increment may vary from that of other custom increments as well as from that of standard and preliminary increments. The length of time associated with a standard increment may be established on a system-wide, account-by-account, or product-by-product basis.

Service increments may be used for purposes related to both account locking and balance deductions. For instance, dividing the service period into one or more service increments may allow system 100 to determine whether the account balance 220 (FIG. 2) is sufficient prior to providing service for an additional service increment. Additionally, call processing module 135 may be configured to provide service to customer 112 for a custom increment rather than a standard increment if account balance 220 is insufficient to provide service for the length of time associated with a standard increment. As will be discussed below, account balance 220 does not necessarily store a monetary value. Rather, account balance 220 may store a unit of service balance. The account may be locked only for the discrete service increments rather than for the entire service period. Accordingly, the account may automatically unlock at the end of any service increment, unless call processing module 135 extends the lock for an additional service increment. In another exemplary approach, the account may remain locked, but call processing module 135 may determine that a lock has expired. A more detailed description of the exemplary operations that may be provided by call processing module 135 is provided below.

A gateway 145 may act as an intermediary between telecommunications network access point 120, customer service terminals 140, and prepaid database system 150. Gateway 145 may include network connections to database system 150, call processing servers 130, and customer service terminals 140. In one exemplary approach, the network connections to gateway 145 may be established on a private local area network or wide area network that can more closely guarantee the quality of service in order to minimize latency and thereby provide real-time or near real-time access and updates to data held in data stores 160 and 165. Gateway 145 may receive all requests for access to prepaid database system 150 in order to provide a barrier to direct access to database system 150. Limiting access to database system 150 may be appropriate in some circumstances. For instance, exemplary approaches may provide, queuing, improved security, access to legacy systems, etc. It is to be understood that some database processors 155 may be capable of handling a large number of requests from the call processing servers 130 and customer service terminals 140 and therefore may eliminate the need for gateway 145.

Gateway 145 may be a web application server, although any computing device having a computer readable medium including instructions for communicating with database system 150 would suffice. Gateway 145 may be a networked computer system configured with server software for accepting connections from the call processing servers 130 and customer service terminals 140. Call processing servers 130, for instance, use these connections to execute remote procedure calls on gateway 145. The remote procedure calls executed on gateway 145 communicate with database processor 150 to retrieve and set data on database system 150 through the stored procedures 170 (discussed below). While FIG. 1 merely depicts a single gateway 145, it is to be understood that gateway 145 may include a pool of gateways 145 configured to share the responsibility of interacting with database system 150.

Database system 150 may be a relational database management system. Many such systems, including SQL Server, Oracle, and MySQL, among others, are generally available. Call processing data store 160 generally stores call processing data in row and column table format, and may include multiple tables. A row, or record, includes one or more columns, or fields, holding data values for specifically defined fields. Rows may be uniquely identified by the values of one or more columns. Indexes of one or more columns can be included to aide in searching for particular rows of the table. Other database systems, e.g., embedded databases, hierarchical systems, file based storage, etc., could be used as database system 150. Database processor 155 includes instructions on a computer readable medium that facilitate database transactions. Such instructions may be provided by one or more stored procedures 170. Additionally, processor 155 may include instructions for the bulk or mass loading of data, e.g. card activations from retail purchases. Similarly, bulk exporting of data may be needed to support accounting and revenue reporting features.

FIG. 1 depicts rate quote data store 165 as being part of database system 150. However, rate quote data store 165 may have uses outside of the context of system 100. Accordingly, it is to be understood that rate quote data store 165 may be external to system 100, such that gateway 145 may access data thereon. In an exemplary approach that excludes gateway 145, rate quote data store 165 may be accessible by call processing servers 130.

Incoming calls to automated call distributor 125 may be routed to customer service terminals 140 in order to provide personalized customer service to customer 112. Customer service terminals 140 may include a computing device and a display. A graphical user interface (GUI), or the like, provided by the terminals 140 may enable customer service personnel to access the prepaid database system 150 through the gateway 145. Accordingly, the customer service terminals 140 may provide access to stored procedures 170 of database system 150. As discussed above, stored procedures 170 may manipulate the data associated with an account record 200.

Figure 2:
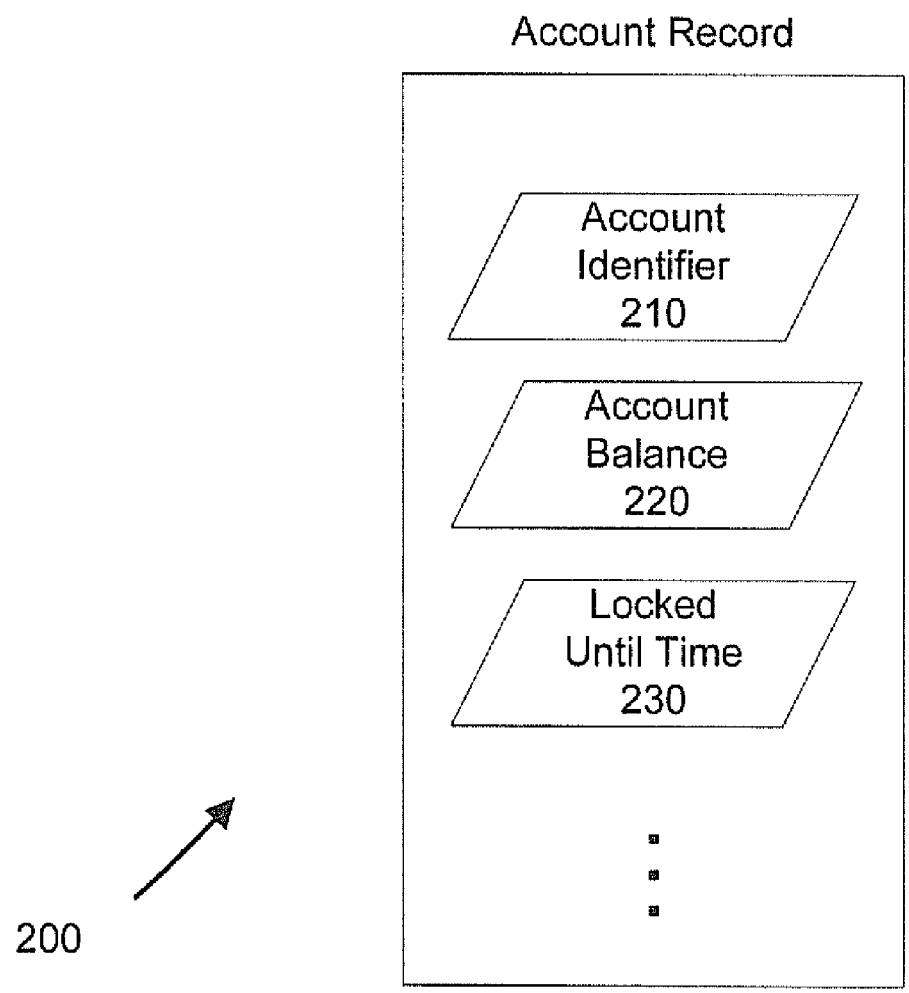
FIG. 2 illustrates an exemplary database table definition relating to a prepaid services account record.

FIG. 2 illustrates an exemplary account record 200 for use with system 100. Account record 200 may be stored in call processing data store 160 of database system 150. An account identifier field 210 provides a unique identifier to differentiate accounts from one another. As noted above, an account balance field 220 specifies the balance available to customer to draw upon when receiving prepaid services. The value stored in account balance field 220 may be a monetary value. However, in other exemplary approaches the value may be the number of units of service that were purchased, e.g., minutes. A locked until time field 230 may store a time related value that may be compared to a reference time in order to determine whether the account lock has expired. An unlocked status of an account may be indicated by storing a time related low value in the locked until time field 230. A time related low value may be any predetermined time in the past. For instance in a system that stores time related values according to the IEE 1003 ("POSIX time") standard, a time related low value may be 00:00:00 Jan. 1, 1970. The reference time may be a time related value suitable for comparison to the locked until time 230. For instance, the reference time may be a time of access of account record 200. In another exemplary approach, the reference time may be the instant time of comparison. A locked until time 230 later in time than the reference time indicates that the lock has not expired and therefore that account has a locked status. A rate associated with the card may further be stored in the account record 200 or may be provided by rate quote data store 165.

Stored procedures 170 (FIG. 1) may include computer executable instructions stored in database system 150 and may provide access to data stored in data stores 160 and 165. Stored procedures 170 may include a balance inquire procedure that accepts an account identifier 210 as a parameter and provides the account balance 220 associated therewith. A deduction and locking procedure may deduct a provided amount from the account balance 220 and additionally set the locked until time field 230. A balance adjustment routine may allow the balance 220 to be restored or adjusted to a larger amount to correct any excessive draw downs.

Prepaid telecommunication accounts represented by exemplary account record 200 may include a physical representation in the form of a plastic card, i.e., a calling card. A calling card representing an account with a prepaid balance 220 stored in database system 150 may be referred to as a remote memory card. Accordingly, the balance 220 is not stored or encoded on the card. The card merely includes the account identifier 210 which enables system 100 to determine the account balance 220 from call processing data store 160. However a physical card is not required and often is not provided due to the ability to purchase prepaid telecommunication services over the Internet from World Wide Web based retailers.

Prior to an account being available for use by customer 112, the accounts must be created. Creation of an account may include the assignment of a unique account identifier 210 and an initial balance 220. In one exemplary approach, the account identifiers 210 are created and loaded into call processing data store 160 in batches. After creation, the account identifiers 210 may be provided to retail businesses for sale. After purchase by customer 112, the retailer may notify system 100 that the account should be activated for access and use by customer 112. However, it is to be understood that retailers are not the only source of prepaid accounts. The prepaid service provider may provide accounts directly to customer 112.

Computing devices such as call processing servers 130, gateway 145, and database processor 155 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as call processing servers 130, gateway 145, and database processor 155, etc., may each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Database system 150 may be a relational database management system (RDBMS). An RDBMS may employ Structured Query Language (SQL) in addition to a language for creating, storing, editing, and executing stored procedures, such as the PL/SQL language mentioned above. However, it is to be understood that database system 150 may be some other kind of database such as a hierarchical database, a set of files, an application database in a proprietary format, etc. Database system 150 generally includes a computing device, i.e., processor 155, employing a computer operating system such as one of those mentioned above, and is accessed via a network in any one or more of a variety of manners, as is well known. Exemplary systems are possible in which at least some of data stores 160 and 165 are both combined as a single data store, or are provided on completely independent databases.

Figure 3:
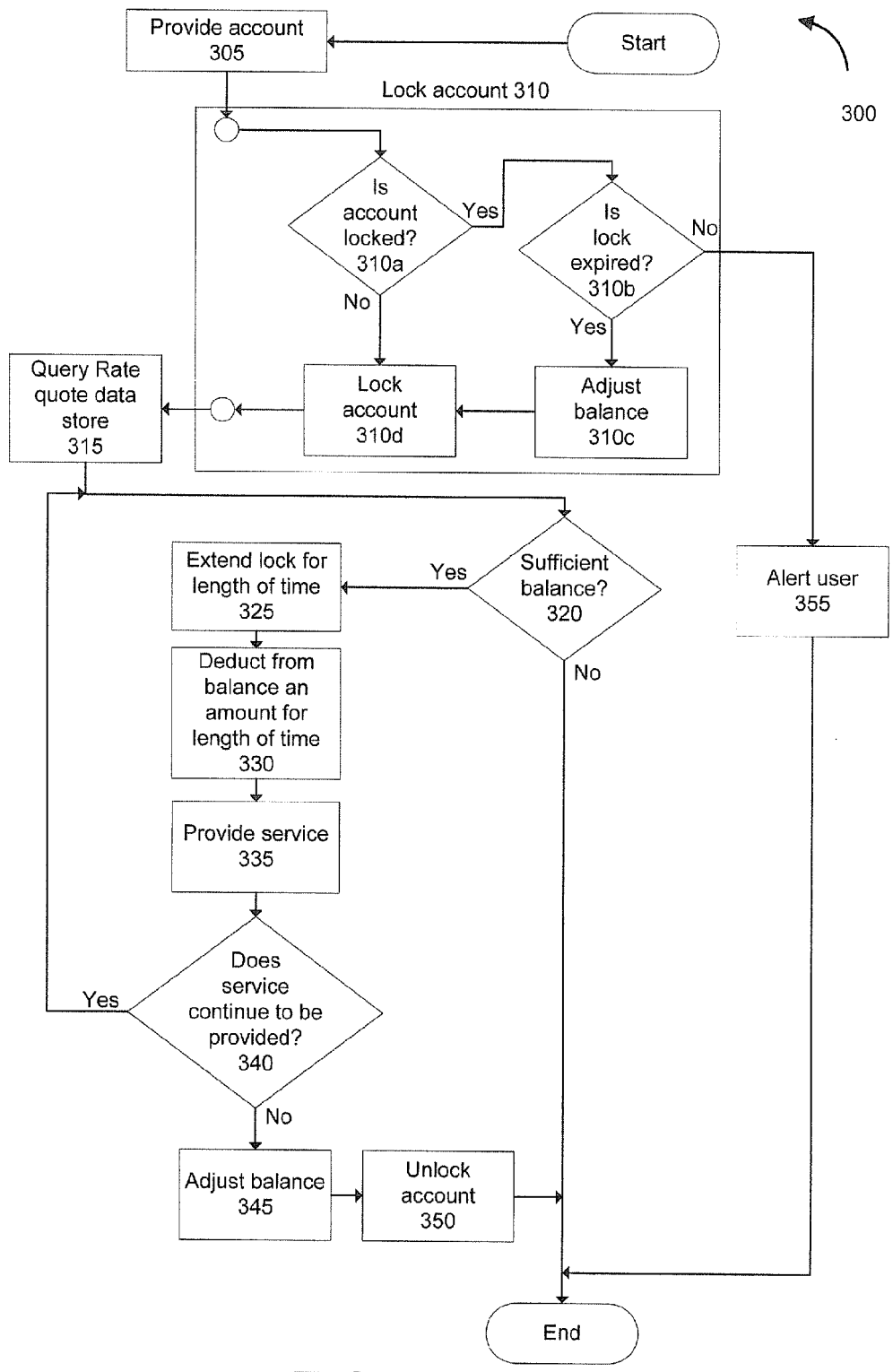
FIG. 3 illustrates a flowchart depicting exemplary steps and decisions relating to a method for providing prepaid services.

FIG. 3 illustrates a flow chart of an exemplary process 300 for providing prepaid services to a customer 112 of a prepaid services system 100. While this process is directed to the provision of prepaid telecommunications services, it is to be understood that these steps are equally applicable to other forms of prepaid services. Call processing servers 130 may include a computer-readable medium having stored instructions for carrying out certain operations described herein, including some or all of the operations described with respect to process 300. For example, some or all of such instructions may be included in call processing module 135.

The process 300 begins in step 305 in which a customer accesses a prepaid account. In one exemplary approach, customer 112 will use originating device 110 to call an access number associated with telecommunications network access point 120. Automated call distributor 125 receives the call and thereby establishes a connection to originating device 110 over telecommunications network 105. Automated call distributor 125 routes the call to call processing servers 130. Customer 112 may be presented with audible instructions for entering an account identifier 210, a security pin, and a telephone number for a terminating device 115.

Next, in step 310, call processing module 135 may attempt to lock the account according to sub-steps 310a-d. In step 310a, it is determined whether the account has a locked or unlocked status. The unlocked status can be determined based on the locked until time 230 associated with the account. A stored procedure 170, may accept the account identifier 210 provided to call processing server 130 by customer 112 in order locate the account record 200 associated therewith. The procedure 170 may further report back the locked until time 230. The locked until time 230 may be compared to see if it is equal to a predetermined time related low value. As discussed above, setting the locked until time 230 to the predetermined time related low value provides an indication that the account has an unlocked status. If the account is unlocked, the process proceeds to step 310d. However, if the account is locked, the process proceeds to step 310b.

In step 310b, it is determined whether the account lock has expired. The account may be locked due to prior use by customer 112 that was improperly interrupted. The locked until time 230 is compared to a reference time to determine whether the lock has expired. If the locked until time 230 is earlier (less) than the reference time, then the lock is determined to be expired. Likewise, if the locked until time 230 is equal to or later (greater) than reference time, then the lock is determined to not be expired. As explained above, the reference time may be a time of access, or might be the current (instant) time of comparison. If the account lock is not expired, the process proceeds to step 355 (discussed below). Alternatively, if the account lock is determined to be expired, the process proceeds to step 310c.

Next, in step 310c, the balance may be adjusted. For instance, customer 112 may be compensated to account for any service interruptions. In one exemplary approach, system 100 may store information related to a call such as a call start time and a length of the call. The length of the call may be updated throughout the call as described below in step 325. Accordingly, if the call was improperly interrupted, the length of the call will not continue to be updated and will therefore closely approximate the actual length of the call. Such a time value approximating the length of the call along with a rate associated with call may be used to determine a balance adjustment amount. While steps 310c and 310d are illustrated as sequential steps, it is to be understood that some exemplary approaches may conduct steps 310c and 310d concurrently or even in a reverse order.

Following a determination in step 310a that the account is unlocked or a balance adjustment in step 310c, the account is locked in step 310d. In one exemplary approach, the account may be locked for a preliminary increment. A preliminary increment may be applied to the account in order to cover the time necessary to handle any pre-provisioning actions. A preliminary increment may lock an account for a length of time less than a standard increment. Locking the account may involve setting the locked until time field 230 in the account record 200. As discussed above, the account record 200 includes a locked until time field 230 that accepts a time value. The field 230 may be filled with a time value corresponding to a future time, which results from the sum of a reference time and the length of time associated with a preliminary increment. As above, the reference time may be a time of access or may be the current (instant) time.

Next, in step 315, the call processing module 135 may query the rate quote data store 165 of the database system 150 to retrieve the amounts to deduct from account balance 220 for each service increment associated with providing service to originating device 110. A particular service may include a rate as well as other costs and fees. Some service providers may charge a fixed fee for each connection to terminating device 115. Taxes may be assessed on a per-unit of service basis. Additionally, there may be fees associated with certain types of pay-per-use phones, i.e. payphones. Accordingly, any costs and fees associated with providing service for a period of time may be retrieved from the rate quote data store.

Next, in step 320, it is determined whether the accessed account has a sufficient balance 220. As discussed above, system 100 divides a service provided to customer 112 over a service period into one or more service increments that may correspond to lengths of time. As discussed above, service increments may include standard increments or custom increments. System 100 may set the length of time corresponding to a standard increment on a system-wide, an account-by-account, or a product-by-product basis. In one exemplary approach, the balance 220 may need to be greater than an amount associated with the provision of service for a standard increment. In addition, system 100 may be configured to charge for service in a minimum billing increment, e.g., one (1) second, one (1) minute, three (3) minutes, etc. The service increment, either standard or custom, may correspond to the minimum billing increment. Moreover, the service increment will typically be greater than or equal to the minimum billing increment. In another exemplary approach, call processing module 135 may be able to provide service for a custom increment that is less than the standard increment. In such an approach, an account balance 220 that is too low for the provision of service for the standard increment may still be effectively depleted by providing service for a custom increment. The length of time associated with a custom increment may be determined based on the service rate (determined in step 315) and the account balance 220. Accordingly, in such an exemplary approach, an account balance 220 may be determined to be insufficient only if it is depleted. If the account balance 220 is insufficient, the process ends. Alternatively, if there is a sufficient balance 220, the process proceeds to step 325.

Next, in step 325, call processing module 135 may extend the lock of the account for either a standard increment or a custom increment as determined above in step 320. Because process 300 may continuously loop between steps 320 and 340, it is to be understood that the account may already be locked due to either step 310 or a previous iteration of this step 325. Extending the lock involves setting the locked until time field 230 in the account record 200. As discussed above, the account record 200 includes a locked until time field 230 that accepts a time value. The field 230 is filled with a time value corresponding to a future time, which results from the sum of a reference time and the service increment, standard or custom. The reference time may be a time of access or may be the current (instant) time. As discussed above, a call record may store the length of a call. The length of the call may be updated by summing the current value associated with the length of the call to the length of the service increment.

Next, in step 330, an amount associated with the service increment may be deducted from the account balance 220. Accordingly, call processing servers 130 may instruct gateway 145 to call a stored procedure with parameters identifying the account and providing the amount to deduct from the balance 220.

Next, in step 335, service may be provided to customer 112 for up to a length of time corresponding to the length of the service increment. In the context of prepaid telecommunication services, call processing server 130 may cause automated call distributor 125 to establish a telecommunications connection between originating device 110 and terminating device 115. Call processing server 130 may further record transaction details including the number of the originating device, the number of the terminating device, the account identifier 210, the rate, and the time that service was initiated. Later, at the conclusion of the service period, the time that service was concluded will be included in the transaction details. The transaction details allow for the reporting of information about the call to an accounting system (not shown). As discussed above, system 100 may be divided among multiple cooperating entities. For instance, a telecommunications service provider may be responsible for providing service by establishing and maintaining the connections between originating device 110 and terminating device 115. The prepaid service provider may be external to the telecommunications service provider and may merely monitor the service provided to customer 112 in order to track and maintain account balance 220.

Next, in step 340, it is determined whether service continues to be provided to customer 112. Call processing servers 130 continuously monitor the connection between originating device 110 and terminating device 115. When the connection is ended, the transaction details are updated to reflect the ending time of the call. If service continues to be provided, the method returns to step 320. If service is no longer being provided, the method proceeds to step 345.

Next, in step 345, the account balance 220 may be updated to accurately account for a call that ended prior to the end of the latest service increment. Because deductions from the account balance 220 are made for one or more service increments in step 330, there is a possibility that the account will be over billed due to the call ending before the end of the latest service increment. Moreover, the total call length, or service period, may be determined to be less that the sum of the lengths of time associated with the service increments. As discussed above, transaction details may include a start and end time of the call such that a call length, i.e. the service period, can be determined. When the service period is less than the sum of the lengths of the service increments, the balance may be adjusted to reflect the actual length of the call. However, if system 100 imposes a minimum billing increment that is equal to the service increment, step 345 may not be required. In another exemplary approach, the account balance 220 may not receive incremental deductions as discussed in step 330. Rather, account balance 220 may be drawn down for the entire length of the call at the conclusion of the call. Such an exemplary approach may also eliminate the need for the balance adjustment of step 345.

Next, in step 350, the account may be unlocked. Unlocking the account may be accomplished by setting the locked until time 230 to a time related low value. As discussed above, a time related low value may be any predetermined time in the past. In one exemplary approach, the time related low value may be 00:00:00 Jan. 1, 1970 if time values are stored according to the IEEE 1003 ("POSIX time") standard.

As discussed above, following a determination that the account lock is not expired in step 310b, customer 112 may be alerted in step 355 to the fact that the accessed account is currently locked and that the lock has not expired. The account may be locked due to use by another customer. Customer 112 may be informed only that the accessed account is locked. Alternatively, customer 112 may be informed that the accessed account is locked for the service increment. An alert that the accessed account is locked may specify the service increment, or may provide the exact value held in the locked until field 230 of the account record 200. Providing the locked until time 230 enables customer 112 to precisely plan when to again attempt to access the account. However, it is to be understood that the account is not guaranteed to be in an unlocked state at the time specified in the locked until field 230 due to the possibility that an ongoing call may update the locked until time 230 with a new value.

Following both steps 350 and 355, as well as a determination of an insufficient balance in step 320, the process ends.

Accordingly, system 100 enables originating device 110 to connect to terminating device 115 with the connection fees and costs being billed to a prepaid account. After connecting to automated call distributor 125, customer's 112 call is forwarded to call processing server 130. Call processing server 130 optionally interacts with gateway 145 to access data held in call processing data store 160 and rate quote data store 165 through stored procedures 170. If an accessed account is not locked and there is a sufficient prepaid balance 220, the call is connected to terminating device 115. Call processing server 130 monitors the call and continuously locks the account by setting a locked until time field 230 throughout the service period.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description, The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A computer-device-implemented method, comprising:
    accessing, via a user, an account to track usage of prepaid services;
    determining whether the account is locked or unlocked;
    providing the user with information regarding a time period that the account will be locked, if the account is determined to be locked;
    locking the account for a length of time, if the account is determined to be unlocked;
    controlling a provision of a prepaid service, of the prepaid services, to the user, the prepaid service being provided for a prepaid service period while the account is locked; and
    extending the length of time that the account will be locked by an additional length of time during the prepaid service period.

2. The method of claim 1, further comprising:
    storing a locked until time in an account record associate with the account, and
    where determining whether the account is locked or unlocked further comprises:
    comparing a reference time to the locked until time.

3. The method of claim 1, where locking the account for a length of time comprises:
    storing, in an account record associated with the account, a locked until time calculated by adding the length of time that the account will be locked by to a reference time, and
    where extending the length of time that the account will be locked further comprises:
    recalculating the length of time that the account will be locked by adding the additional length of time, during the service period, to the length of time that the account will be locked.

4. The method of claim 1, where controlling the provision of the prepaid service comprises one of:
    determining that a balance associated with the account is less than an amount necessary to provide the prepaid service for the length of time that the account will be locked, and
    preventing a provision of the prepaid service based on the determination, or
    determining that a balance associated with the account is less than an amount necessary to provide the service for the additional length of time, and
    halting a provision of the prepaid service based on the determination.

5. The method of claim 4, where the balance is a monetary balance and the amount represents a monetary cost.

6. The method of claim 4, where the balance is a time balance and the amount represents the length of time that the account will be locked.

7. The method of claim 1, where locking the account for a length of time comprises:
    deducting an amount associated with providing the Prepaid service for the length of time from a balance, associated with the account, and where
    extending the length of time that the account will be locked further comprises:
    deducting an amount associated with providing the prepaid service for the additional length of time from the balance associated with the account.

8. The method of claim 7, further comprising:
    recalculating the balance based on a determination that the service period is less than a sum of the length of time that the account will be locked and each additional length of time added by extending the length of time that the account will be locked.

9. The method of claim 2, where the reference time is one or more of:
    a time that a record associated with the prepaid account is accessed, or
    an instant time that the locked until time is compared to the reference time.

10. A system, comprising:
    a prepaid account to be accessed by a user of an originating device;
    a memory to store information associated with the prepaid account;
    at least one call processing server communicatively coupled to the memory; and
    an account record, stored in the memory, the account record including a locked time field to store an entry value indicative of an expiration of a lock of the prepaid account,
    where the at least one call processing server is to prevent a provision of a service, to the user of the originating device, based on a determination that a reference time is less than the entry in the locked time field of the account record, associated with the prepaid account that is accessed by the user of the originating device.

11. The system of claim 10, where the call processing server further is to:
set the locked time field to a time later than the reference time.

12. The system of claim 10, where the account record further includes a balance field that specifies a balance available to the user, of the originating device, when accessing the service, and
where the at least one call processing server further is to:
provide, to the user of the originating device, the service based on a determination that an entry in the balance field of the account record is greater than an amount associated with the provision of the service for a certain period of time.

13. The system of claim 10, where the at least one call processing server further is to:
deduct, from the entry in the balance field of the account record, an amount associated with the provision, to the user of the originating device, of the service for a certain period of time.

14. The system of claim 13, where the at least one call processing server further is to:
recalculate the entry in the balance field of the account record when a service period, for the provision, to the user of the originating device, of the service, is less than the certain period of time.

15. The system of claim 10, where the call processing server further is to:
notify the user of the originating device of the entry stored in the locked time field of the record associated with the prepaid account.

16. A method, comprising:
monitoring an attempt to receive a prepaid service by a service requestor having a prepaid account;
preventing the service requestor from receiving the prepaid service based on a determination that a reference time is earlier than an entry stored in a locked time field of a record associated with the prepaid account, where the entry indicates an expiration of a lock of the prepaid account;
setting the entry in the locked time field to a future time, the future time being a certain time after the reference time; and
providing the prepaid service to the service requestor based on a comparison of the entry stored in the locked time field to the future time.

17. The method of claim 16, where providing the prepaid service to the service requestor further comprises:
comparing a monetary or time balance, associated with the prepaid account, to a monetary or time amount associated with the service for the certain period of time.

18. The method of claim 16, further comprising:
deducting a monetary or time amount from a monetary or time balance associated with the prepaid account, where the monetary or time amount represents an amount of money or time expended by providing the prepaid service for a certain period of time.

19. The method of claim 18, further comprising:
recalculating the monetary or time balance based on the prepaid service being provided for a service period that is less than the certain period of time.

20. The method of claim 16, further comprising:
notifying the service requestor of the entry in the locked time field of the record associated with the prepaid account.

* * * * *